Figure 4:
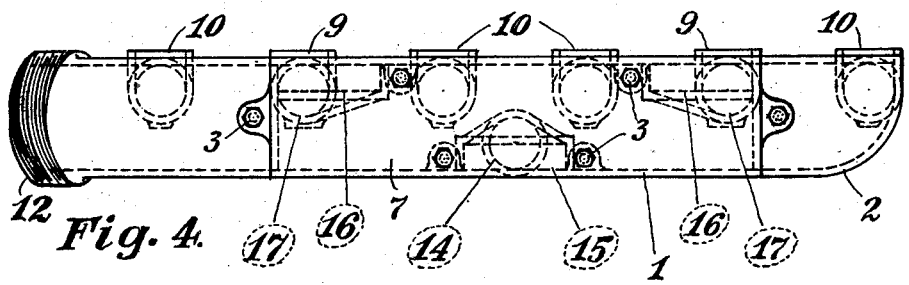

Oct. 14, 1930.   J. J. WILSON   1,778,617
COMBINED INTAKE AND EXHAUST MANIFOLD FOR INTERNAL COMBUSTION ENGINES
Filed Oct. 9, 1926   2 Sheets-Sheet 1
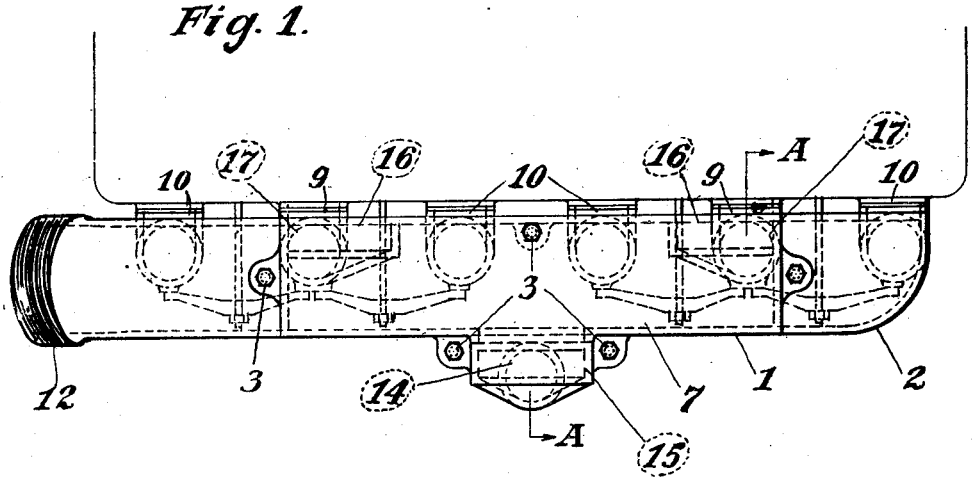
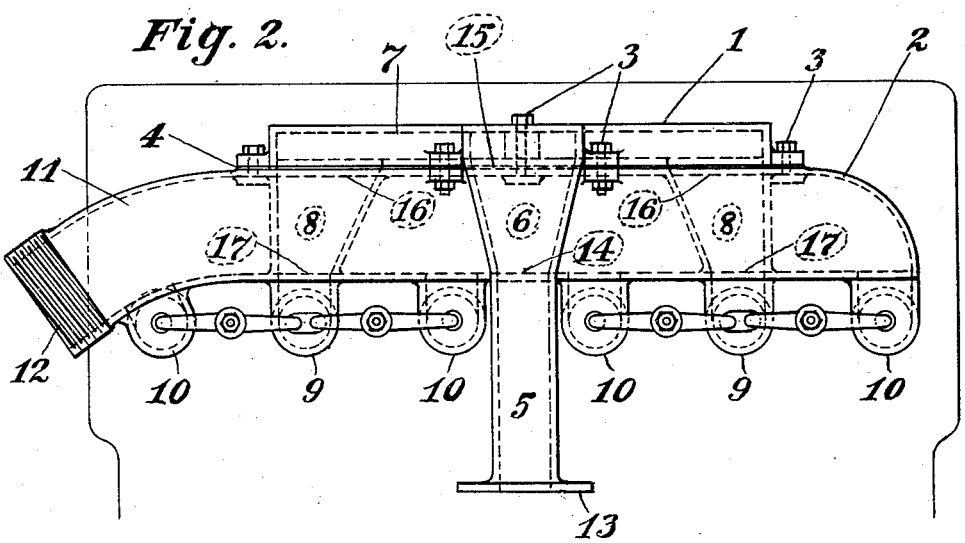
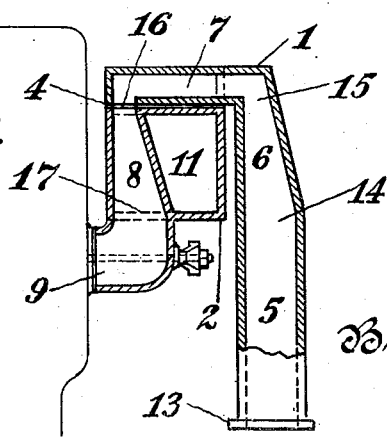
Inventor:
Joseph John Wilson
By Joseph J. Schnebelen
His Attorney.

Oct. 14, 1930.  J. J. WILSON  1,778,617
COMBINED INTAKE AND EXHAUST MANIFOLD FOR INTERNAL COMBUSTION ENGINES
Filed Oct. 9, 1926  2 Sheets-Sheet 2

Inventor:
Joseph John Wilson
By Joseph J. Schnebelen
His Attorney.

Patented Oct. 14, 1930

1,778,617

UNITED STATES PATENT OFFICE

JOSEPH JOHN WILSON, OF ST. LOUIS, MISSOURI

COMBINED INTAKE AND EXHAUST MANIFOLD FOR INTERNAL-COMBUSTION ENGINES

Application filed October 9, 1926. Serial No. 140,566.

This invention relates to combined intake and exhaust manifolds for use with internal combustion engines; designed to operate upon fuel, which requires the application of a considerable quantity of heat to the mixture of air and fuel formed by the carburetor in order to insure satisfactory operation of the engine, such for example, as engines designed to utilize gasoline, kerosene, and similar hydrocarbons or substances.

The purpose of my invention is to provide a combined manifold that will serve both the intake and exhaust systems of internal combustion engines; that utilizes the heat of the exhaust gases to vaporize and intimately fix the incoming fuel charges; that increases the velocity of the incoming fuel charges between the carbureter and the engine intake port; that gives marked economy in the consumption of fuel that efficiently vaporizes kerosene and other hydrocarbon fuels; that eliminates sudden thermal changes in the incoming fuel charges; that prevents undue reduction of, and stabilizes volumetric efficiency in the engine; that secures and maintains an equal distribution of a thoroughly vaporized gas to all cylinders of the engine; that reduces the tendency of the engine to overheat; that will reduce the accumulation of carbon on the cylinder walls of the engine; that is quickly placed in position on an engine in place of the usual separate manifolds that is simple in construction; and that can be economically manufactured.

With these and various other objects in view, I illustrate in the accompanying drawings, forming a part of these specifications, such instances of adaptation as will disclose the broad underlying novel features of construction without limiting myself to specific details, and in which like numbers of reference denote like parts wherever they occur.

Figure 5:
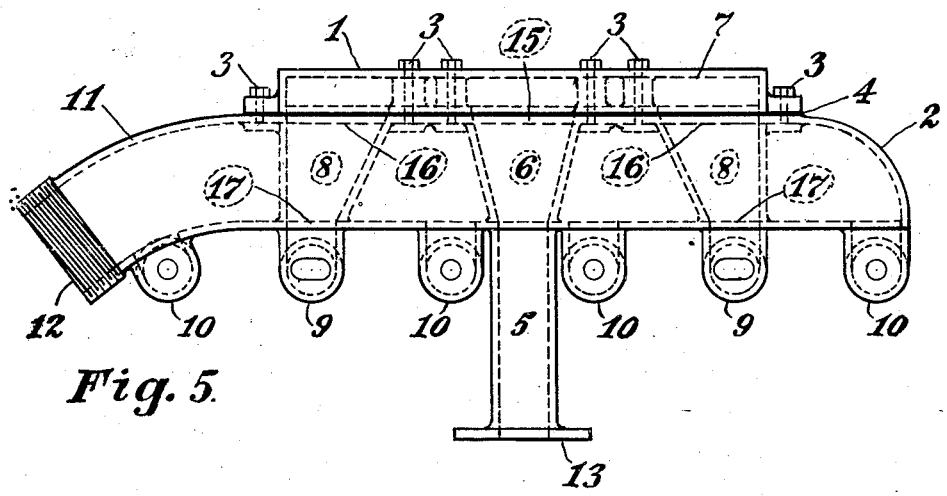
Figure 6:
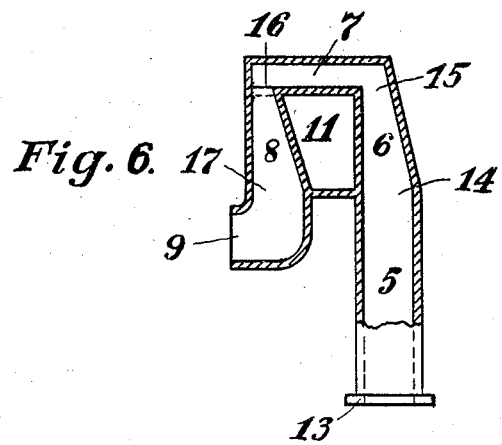

Referring to the drawings:

Figure 1 is a top plan view of the preferred form of the invention; Figure 2 is a front elevation of the same form; Figure 3 is a sectional view taken on the line A—A as indicated on Figure 1 of the drawings; Figure 4 is a top plan view of a modified form of the invention; Figure 5 is a front elevation of the modified form shown in Figure 4, and hereinafter described; and Figure 6 is a typical sectional view showing an integral constructed manifold adaptable to the preferred as well as to the various modified forms hereinafter described.

In the form of the invention depicted in Figures 1, 2 and 3 of the drawings, the manifold is preferably composed of two major units, the vaporizing or intake compartment unit 1, and the heating or exhaust compartment unit 2, fastened together by means of bolts 3, or other suitable means, with a gasket 4 placed between the units to prevent leakage.

The intake compartment unit 1 which is placed over and above the exhaust compartment unit 2, consists of three distinct integral units or changes in passage formations: the neck 5; the diverging supply passage 6; and the intake compartment 7.

The exhaust compartment unit 2 which is placed below the intake compartment unit 1 is composed of two separate and distinct passage systems; the intake system, and the exhaust systems integrally constructed in one unit.

The intake passage system consists of a converging discharge passage 8, and an elbowed intake port connection 9, in direct communication with said passage for each engine intake port or pair of engine cylinders.

The exhaust passage system consists of an elbowed exhaust port connection 10 for each engine exhaust port or engine cylinder, an exhaust compartment 11 in direct communication with said connection, and an exhaust outlet connection 12 in direct communication with the exhaust compartment 11.

The neck 5, consists of a tube like structure having preferably a circular formed passage extending vertically from the carburetor connection 13 to its integral communication with the throat 14 of the diverging supply passage 6.

The diverging supply passage 6 consists of a shell like structure diverging from its throat 14 or integral communications with the neck 5, to a preferably rectangular formed passage at its mouth 15 or integral communication with the intake compartment 7.

The intake compartment 7 consists of a box like shell or structure having preferably a rectangular opening in the side walls as its integral communication with the mouth 15 of the supply passage 6, and one preferably rectangular passage opening in the bottom wall for each engine intake port or pair of engine cylinders, located so that each opening will be directly over the mouth 16 of each converging discharge passage 8, of the exhaust compartment unit 2, thus forming a communication between the intake passage system of the exhaust compartment unit 2, and the passage system of the intake compartment unit 1.

The converging discharge passage 8, forming part of the intake system of the exhaust compartment unit 2, consists of a shell like structure form integral with and projecting from the side wall of the heating compartment 11, and converging from preferably a rectangular formed passage at its mouth 16 to a preferably circular formed passage at its throat 17 or integral communication with the elbowed intake port connection 9, and an elbowed intake port connection 9 integrally communicated with the throat 17 of the converging discharge passage 8.

The heating or exhaust compartment 11 consists of a box like shell having preferably a circular opening in the bottom wall, and an elbowed exhaust port connection 10 integrally communicating with said opening for each engine exhaust port or engine cylinder, and an exhaust outlet connection 12.

From the foregoing description, taken in connection with the accompanying drawings, it will be seen that as the mixture of atomized air and fuel formed by the carburetor, passes through the diverging supply passage, the molecules of air and fuel are thoroughly broken up, due to the formation of the supply passage preparatory to being drawn into the vaporizing chamber by the suction produced by the engine.

It should be further pointed out that the construction embodying the broad feature of placing the vaporizing compartment over and above the exhaust compartment, a large heat radiating surface is thus provided by subjecting the entire bottom wall to the rising heat produced by the exhaust gases passing beneath it, and owing to the integral metallic construction of the wall of this compartment, and the heat conducting property of metal, the entire integral compartment is thereby heated, thus providing an efficient vaporization of the atomized air and fuel charges in the shortest possible time constant, whereby great economies are secured.

Another advantage derived from placing the vaporizing compartment as heretofore described, is the elimination of all sudden thermal changes, thus preventing condensation of gases on the walls of the intake compartment, and thereby increasing the entire engine efficiency.

It will also be seen that, due to the converging formation of the discharge passage and the suction produced by the engine, the velocity of the incoming fuel charges is greatly increased, thereby reducing the dispatch of the incoming fuel charges to the shortest possible time constant; and due to the placing of the discharge passage so that its walls project into the passage of the exhaust compartment, as shown in the preferred form of the invention, the vaporized gases are superheated to the same temperature as the walls of the engine cylinders, and thereby reducing the accumulation of carbon on the cylinder walls.

It should be borne in mind that the converged supply passage may also be placed so that its wall will project out into the exhaust passage, as illustrated in Figures 4 and 5 of the drawings, whereby the incoming fuel charges are pre-heated preparatory to entering the intake compartment, and it should be kept in mind that the manifold may be constructed in one integral unit or piece as illustrated in Figure 6 of the drawings.

What I claim is:

1. A combined intake and exhaust manifold for internal combustion engines, comprising an exhaust compartment, fuel discharge passages of rectangular cross section extending vertically through the exhaust compartment and decreasing in width and increasing in depth from their upper to their lower ends, a shallow intake compartment of rectangular cross section located immediately above the exhaust compartment and communicating at its ends with the discharge passages, and a neck extending downwardly from and communicating at its upper end with the intake compartment at a point centrally between the ends of the latter, said neck having a circular supply passage and a throat of rectangular cross section extending from the upper end of the supply passage to the intake compartment, and the throat increasing in width and decreasing in depth from its lower to its upper end.

2. A combined intake and exhaust manifold for internal combustion engines, comprising an exhaust compartment, fuel discharge passages of rectangular cross section extending vertically through the exhaust compartment and having vertical rear and outer lateral walls, inner lateral walls inclining downwardly and in the direction of the outer lateral walls and front walls inclining downwardly and in a direction away from the rear walls, a shallow intake compartment of rectangular cross section located immediately above the exhaust compartment and communicating at its ends with the discharge passages, and a neck extending downwardly from and communicating at its upper end with the intake compartment at a point centrally between the ends of the latter, said neck having a circular supply passage and a throat of rectangular cross section extending from the upper end of the supply passage to the intake compartment, and the throat having a vertical rear wall, upwardly and outwardly inclined side walls and an upwardly and rearwardly inclined front wall.

JOSEPH JOHN WILSON.